United States Patent
Pedersen

(10) Patent No.: US 10,713,188 B2
(45) Date of Patent: Jul. 14, 2020

(54) INTER-PROCESS SIGNALING SYSTEM AND METHOD

(71) Applicant: Atmel Corporation, San Jose, CA (US)

(72) Inventor: Frode Milch Pedersen, Trondheim (NO)

(73) Assignee: Atmel Corporation, San Jose, CA (US)

(*) Notice: Subject to any disclaimer, the term of this patent is extended or adjusted under 35 U.S.C. 154(b) by 261 days.

(21) Appl. No.: 15/277,971

(22) Filed: Sep. 27, 2016

(65) Prior Publication Data

US 2018/0011804 A1    Jan. 11, 2018

Related U.S. Application Data

(60) Provisional application No. 62/359,084, filed on Jul. 6, 2016.

(51) Int. Cl.
| | | |
|---|---|---|
| G06F 13/24 | (2006.01) | |
| G06F 13/16 | (2006.01) | |
| G06F 9/52 | (2006.01) | |
| G06F 15/173 | (2006.01) | |

(52) U.S. Cl.
CPC ............ *G06F 13/1663* (2013.01); *G06F 9/52* (2013.01); *G06F 13/24* (2013.01); *G06F 15/17325* (2013.01); *Y02D 10/14* (2018.01)

(58) Field of Classification Search
CPC .............................. G06F 13/1663; G06F 13/24
See application file for complete search history.

(56) References Cited

U.S. PATENT DOCUMENTS

| | | | | |
|---|---|---|---|---|
| 5,249,279 A | * | 9/1993 | Schmenk | G06F 3/0601 710/5 |
| 6,128,672 A | * | 10/2000 | Lindsley | G06F 9/4812 710/15 |
| 6,298,370 B1 | * | 10/2001 | Tang | G06F 9/5044 718/100 |
| 6,430,593 B1 | * | 8/2002 | Lindsley | G06F 9/4812 712/229 |
| 7,313,794 B1 | * | 12/2007 | Ansari | G06F 9/52 710/108 |
| 8,738,860 B1 | * | 5/2014 | Griffin | G06F 12/0897 711/122 |
| 2004/0221246 A1 | * | 11/2004 | Emerson | G06F 9/52 710/4 |
| 2010/0069035 A1 | * | 3/2010 | Johnson | H04W 4/02 455/404.1 |

(Continued)

OTHER PUBLICATIONS

"Overview of Synchronization Primitives", Microsoft Docs, Mar. 30, 2017, retrieved from https://github.com/dotnet/docs/blob/master/docs/standard/threading/overview-of-synchronization-primitives.md.*

*Primary Examiner* — Jing-Yih Shyu
(74) *Attorney, Agent, or Firm* — Fish & Richardson P.C.

(57) ABSTRACT

An inter-process signaling system and method support implementation of semaphores or messaging signals between masters in a multi-master system, or between tasks in a single master system. A semaphore flag register contains one or more bits indicating whether resources are free or busy. The register is aliased to allow atomic read-and-clear of individual bits in the register. Masters poll the status of a resource until the resource reads as free. Alternatively, interrupts or events per master can be implemented to indicate availability of a resource.

20 Claims, 2 Drawing Sheets

(56) References Cited

U.S. PATENT DOCUMENTS

| | | | | |
|---|---|---|---|---|
| 2013/0090745 A1* | 4/2013 | Frazer | .................... | G05B 15/02 |
| | | | | 700/12 |
| 2013/0111168 A1* | 5/2013 | Circello | .................. | G06F 9/526 |
| | | | | 711/163 |
| 2013/0283285 A1* | 10/2013 | Zhou | .................... | G06F 9/4881 |
| | | | | 718/103 |
| 2014/0149601 A1* | 5/2014 | Carney | ............... | H04L 67/1097 |
| | | | | 709/238 |
| 2015/0370678 A1* | 12/2015 | Tufvesson | .......... | G06F 11/3013 |
| | | | | 702/186 |
| 2015/0378939 A1* | 12/2015 | Mohamed | ........... | G06F 13/1663 |
| | | | | 711/150 |

* cited by examiner

INTER-PROCESS SIGNALING SYSTEM AND METHOD

CROSS-REFERENCE TO RELATED APPLICATION

This application claims priority to U.S. Provisional Patent Application No. 62/359,084, filed Jul. 6, 2016, the entire contents of which are incorporated herein by reference.

TECHNICAL FIELD

The subject matter of this disclosure relates generally to inter-process signaling between masters or tasks.

BACKGROUND

A multi-master system (e.g., multi-processor system) typically contains resources which are shared among the masters. These shared resources can include peripherals or memory regions, for example. In many cases, these shared resources can only be accessed by one master at a time, which requires a semaphore to atomically test whether the resource is free and allocate the resource if it is free. A semaphore is a variable or abstract data type that is used for controlling access, by multiple processes or processors. Other masters need to wait for the semaphore to be released until their access to the resource can be granted.

Another case of signaling between masters is as part of a messaging protocol. Shared memory can be used to exchange messages between masters. A signal is sent from a first master to indicate to a second master that a new message is available in a queue. Semaphores and messaging signals are also required in operating systems executing on one master, and these semaphores and messaging signals may or may not rely on hardware available in the system.

SUMMARY

The disclosed embodiments provide a mechanism to support implementation of semaphores or messaging signals between masters in a multi-master system (e.g., multi-processor system), or between tasks in a single master system (e.g., a single processor system). A semaphore flag register contains one or more bits indicating whether shared resources are free or busy. The register can be aliased to allow atomic read-and-clear of individual bits in the register. Masters poll the status of a resource until the resource reads as free. Alternatively, interrupts or events per master can be implemented to indicate availability of a resource.

In an embodiment, an inter-process signaling system comprises: a plurality of masters; a plurality of resources shared by the plurality of masters; and an inter-process signal module coupled to the plurality of masters and the plurality of resources, the inter-process signal module including: a semaphore flag (SFLAG) register containing at least one bit per resource that indicates whether a resource is free or busy; an SFLAG set (SFLAGSET) register for selectively setting individual bits in the SFLAG register; and an SFLAG clear (SFLAGCLR) register for selectively clearing individual bits in the SFLAG register.

In an embodiment, an inter-process signaling method comprises: receiving, by an inter-process signal module, a first request from a first master to access one of a plurality of resources, wherein each resource is represented by one or more bits contained in a semaphore flag (SFLAG) register; responsive to receiving the first request, selectively setting or clearing a bit in the SFLAG register by selectively setting or clearing a corresponding bit in one or more alias registers; receiving, by the inter-process signal module, a second request from a second master to access one of a plurality of resources; and sending, by the inter-process signal module to the second master, a signal indicating a current status of the requested resource.

DETAILED DESCRIPTION

Example System

Figure 1:
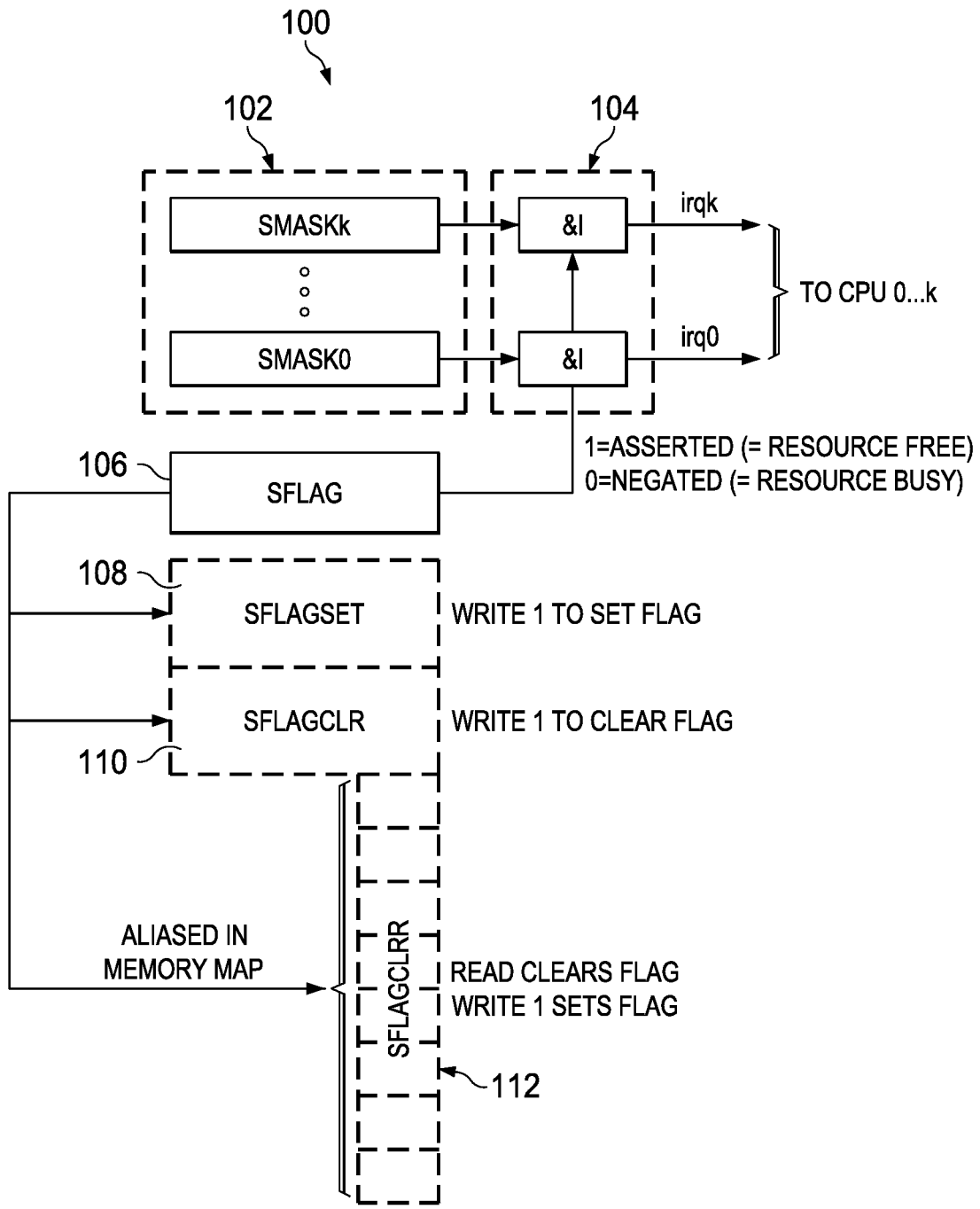
FIG. 1 illustrates a system for inter-process signaling for semaphores, according to an embodiment.

FIG. 1 illustrates a system 100 for inter-process signaling for semaphores, according to an embodiment. System 100 includes semaphore mask 102, interrupt generator 104, semaphore flag (SFLAG) register 106, semaphore flag set (SFLAGSET) register 108, semaphore flag clear (SFLG-CLR) register 110 and memory locations 112.

In an embodiment, SFLAG register 106 contains one bit per resource in system 100. SFLAG register 106 can be written arbitrarily by masters to reset SFLAG register 106 to a known state or for development purposes. It is also possible to set or clear specific bits in SFLAG register 106 by writing that specific bit in SFLAGSET register 108 and SFLAGCLR register 110, which are alias registers, i.e., address locations used to manipulate the physical SFLAG register in software. SFLAG register 106 can also be aliased to multiple sequential memory locations 112, so each bit can be accessed as one register: SFLAGCLRR[n]=SFLAG[n]. Reading SFLAGCLRR[n] will automatically return a current value of SFLAG[n] and clear the SFLAG [n] bit. Writing 1 to SFLAGSET[n] will set the SFLAG[n] bit.

In an embodiment, a master accessing a resource will read SFLAGCLRR[n] until it reads as 1. At this point, the resource can be accessed only by this master, since other masters will read the flag as 0. Once the resource can be freed up, the granted master writes 1 to SFLAGCLRR[n]. A master reading SFLAGCLRR[n] as 0 will keep polling SFLAGCLRR[n] until it reads as 1. Alternatively, an interrupt can be generated by interrupt generator 104, allowing the stalled masters to save power.

In an embodiment, there is one SMASK register $102_0$-$102_k$ per master indicating which of the SFLAG bits should generate an interrupt request for that master, k is a positive integer value and equals to the number masters in system 100. Interrupt generator 104 includes logic that performs the Boolean function:

$$irq_k = \|(SMASK[k] \& SFLAG).$$

The logic above performs a bitwise AND between each bit in SMASK[k] and each bit in SFLAG, where both SMASK[k] and SFLAG are n bits wide. The disclosed embodiments can also produce an event output to each master as an alternative to the interrupt request. Some masters can suspend operation using a "wait for event" command, until the event is received. The master will then reside in a low-power state and wake up when its flag has been set without the need to execute an interrupt handler, reducing response time.

Figure 2:
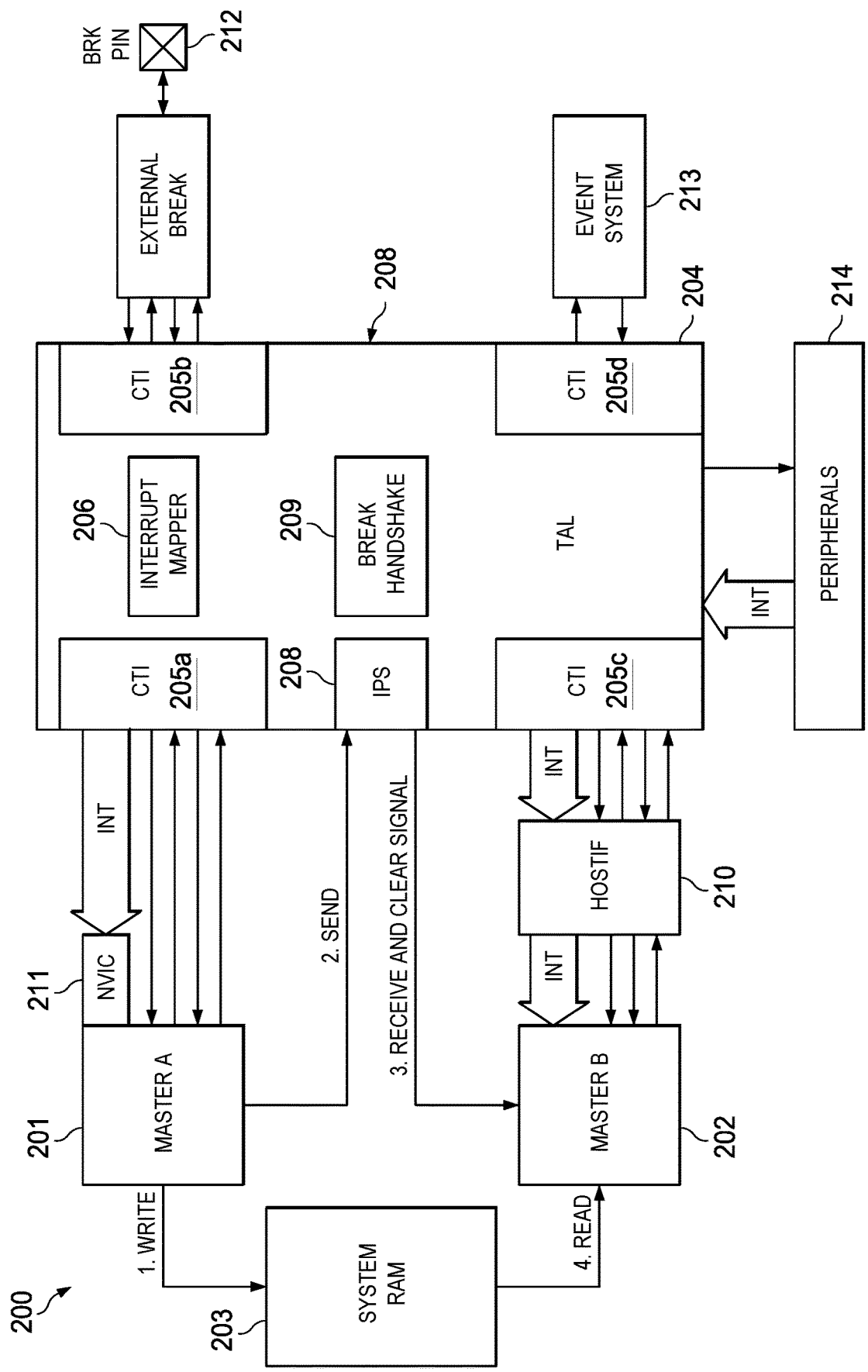
FIG. 2 is a block diagram of a system with inter-process signaling for message protocols, according to an embodiment.

FIG. 2 is a block diagram of a system 200 with inter-process signaling for message protocols, according to an embodiment. System 200 includes processors 201, 202, shared memory resource 203 (e.g., RAM), trigger allocator (TAL) 204, cross-trigger interfaces (CTIs) 205a-205d, interrupt mapper 206, inter-process signals (IPS) module 208, break handshake module 209, host interface (HOSTIF) 210, interrupt controller (IC) 211, break (BRK) pin 212, event system 213 and peripherals 214.

Processor 201 can be Cortex® M4 processor developed by Arm®, Inc., San Jose, Calif., USA, and IC 211 can be a nested vector interrupt controller (NVIC) also developed by Arm® Inc. The NVIC supports an implementation-defined number of interrupts, a programmable priority level for each interrupt, level and pulse detection of interrupt signals, dynamic reprioritization of interrupts, grouping of priority values into group priority and subpriority fields and interrupt tail-chaining. Processor 202 can be a pico power processor (pPP) developed by Atmel Inc., San Jose, Calif., USA.

In an embodiment, CTIs 205a-205d can be a Cortex® CTI developed by Arm® Inc. CTIs 205a-205d are operable to generate interrupts when a trigger event occurs. Each CTI 205a-205d can be connected to a number of trigger inputs and trigger outputs, each trigger input can be connected to one or more trigger outputs.

In an embodiment, event system 213 allows peripherals 214 to interact without intervention from processors 201, 202. Several peripherals 214 can generate events, often on the same conditions as interrupt requests. These events are routed through an event routing system to event users, where certain actions can be triggered by the event.

TAL 204 configures cross-triggering among processors 201, 202, event system 213 and external break pin 212. TAL 204 also configures one of processors 201, 202 to handle each interrupt request. TAL 204 dynamically handles debug break and restart events among processors 201, 202, event system 213 and external break pin 212 using CTIs 205a-205d and break handshake module 209. Some example features include: 1) global masking of break event sources; 2) individual masking of break event sources for each processor; 3) individual interpretation of a break event as debug break or interrupt for each processor; 4) generating TAL output on break event; and 5) triggering break events on event inputs to TAL 204.

TAL 204 dynamically handles interrupt requests requested by processors 201, 202 using interrupt mapper 206. Some example features include: 1) individual selection of processor handling each interrupt request; 2) individual selection of processor handling of each direct memory access controller (DMAC) channel interrupt, event system channel interrupt and external interrupt controller (EIC) external interrupt; 3) software triggering of any interrupt request; and 4) event output of any interrupt request (e.g., to monitor min-max latency). For a DMAC and event system that have multiple channel interrupts, and for the EIC that has several external interrupts, the selection of processor 201, 202 to handle a given interrupt request can be done for each channel interrupt or external interrupt.

TAL 204 handless inter-process signals or semaphores, including atomic test-and-clear of signals providing exclusive access to shared memory resource 203 and an optional interrupt or event output when the requested shared memory resource 203 is freed. More particularly, TAL 204 allows inter-process communication through synchronization primitives to be used among processors or threads running either on the same processor or on separate processors. TAL 204 provides atomic test-and-clear on inter-process signals and can signal that shared memory resource 203 is freed through either an IPS interrupt request to the corresponding processor 201, 202 or an output event to event system 213. The synchronization primitives allow implementing binary semaphores, mutexes, object locks or monitors with wait and notify, signal and wait, release and acquired, or signal and continue protocols, among others.

IPS module 208 is operable to manage inter-process signaling and includes the registers described in reference to FIG. 1, including SFLAG[n], SFLAGSET[n] and SFLAG-CLR[n] registers.

A synchronization example to access shared memory resource 203 through TAL 204 using IPS module 208 will now be described with reference to the numerical steps 1-4 shown in FIG. 2 (1. Write, 2. Send, 3. Receive and Clear Signal, 4. Read). In this example, message signaling is used by processors 201, 202 to access shared memory resource 203. SFLAG[0] is allocated to processor 201 and SFLAG[1] is allocated to processor 202. In Steps 1 and 2, processor 201 can a send a message to processor 202 by writing the message to shared memory resource 203, then writing 1 to SFLAGSET[1] to indicate that a new message is available. In Step 3, processor 202 keeps polling SFLAG[1] until a new message is available. In Step 4, processor 202 reads the message from shared memory resource 203 and writes SFLAGCLR[1] to 0. Processor 201 can also set SMASK[1] to 1 to automatically receive an interrupt whenever a new message is available. Processor 201 can respond to processor 202 by another buffer, and likewise use SFLAG[0] to indicate the presence of a message in that buffer.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. An inter-process signaling system comprising:
   a plurality of masters;
   a plurality of resources shared by the plurality of masters; and
   an inter-process signal module coupled to the plurality of masters and the plurality of resources, the inter-process signal module including:
      a semaphore flag (SFLAG) register containing at least one bit per resource that indicates whether a resource is free or busy;
      an SFLAG set (SFLAGSET) register for selectively setting individual bits in the SFLAG register; and
      an SFLAG clear (SFLAGCLR) register for selectively clearing individual bits in the SFLAG register.

2. The system of claim 1, wherein the bits in the SFLAG register are aliased to sequential memory locations, so that the bits can be accessed individually by a SFLAGCLRR register.

3. The system of claim 2, wherein the SFLAGCLRR register provides atomic read-to-clear access.

4. The system of claim 1, further comprising:
a plurality of semaphore mask (SMASK) registers, wherein each of the SMASK registers is associated with one of the plurality of masters and indicates which of the SFLAG register bits will produce an interrupt request for its associated master.

5. The system of claim 4, further comprising:
an interrupt generator for generating an interrupt request based on contents of one of the SMASK registers and the SFLAG register.

6. The system of claim 4, where an interrupt $irq_k$ is produced by $$irq_k = \|(SMASK[k] \& SFLAG),$$

where k is positive integer value that is equal to the number of masters in the system.

7. The system of claim 1, further comprising:
an event system coupled to the inter-process signal module, wherein the inter-process signal module is operable to produce an event output for the event system.

8. The system of claim 1, wherein at least one of the plurality of resources is shared system memory and at least two of the plurality of masters are central processing units.

9. The system of claim 1, further comprising:
a plurality of cross-trigger interfaces coupled to the plurality of masters and the inter-process signal module and operable to generate interrupts in response to receiving inter-process signals.

10. The system of claim 1, wherein the inter-process signal module is operable to provide inter-process signal communication between one or more processes or threads running on a single master or multiple masters using synchronization primitives.

11. An inter-process signaling method comprising:
receiving, by an inter-process signal module, a first request from a first master to access one of a plurality of resources, wherein each resource is represented by one or more bits contained in a semaphore flag (SFLAG) register;
responsive to receiving the first request, selectively setting or clearing a bit in the SFLAG register by selectively setting or clearing a corresponding bit in one or more alias registers;
receiving, by the inter-process signal module, a second request from a second master to access one of the plurality of resources; and
sending, by the inter-process signal module to the second master, a signal indicating a current status of the requested resource.

12. The method of claim 11, wherein individual bits of the SFLAG register are set by an SFLAG set (SFLAGSET) alias register and individual bits of the SFLAG register are cleared by an SFLAG clear (SFLAGCLR) alias register.

13. The method of claim 12, wherein the bits in the SFLAG register are aliased to sequential memory locations, so that the bits can be accessed individually by a SFLAG-CLRR register.

14. The method of claim 13, wherein the SFLAGCLRR register provides atomic read-to-clear access.

15. The method of claim 14, further comprising:
generating an interrupt request based on contents of one of a plurality of semaphore mask (SMASK) registers and the SFLAG register.

16. The method of claim 15, where an interrupt $irq_k$ is produced by $$irq_k = \|(SMASK[k] \& SFLAG),$$

where k is positive integer value that is equal to the number of masters in the system.

17. The method of claim 11, further comprising:
producing an event output for an event system coupled to the inter-process signal module.

18. The method of claim 11, wherein at least one of the plurality of resources is shared system memory and at least two of the plurality of masters are central processing units.

19. The method of claim 11, further comprising:
generating interrupts in response to receiving inter-process signals from one or more masters.

20. The method of claim 11, further comprising:
providing inter-process signal communication between one or more processes or threads using synchronization primitives.

* * * * *